United States Patent [19]

Yamada et al.

[11] Patent Number: 5,103,363
[45] Date of Patent: Apr. 7, 1992

[54] DISK CARTRIDGE WITH LUBRICATING MEANS IN CONTACT WITH SPINDLE OF DRIVE MEANS

[75] Inventors: Takashi Yamada; Yutaka Murano, both of Yokohama; Shintaro Hirakawa, Tokyo; Akio Suzuki, Yokohama, all of Japan

[73] Assignee: Kabushiki Kaisha Toshiba, Kawasaki, Japan

[21] Appl. No.: 480,043

[22] Filed: Feb. 14, 1990

[30] Foreign Application Priority Data

Mar. 9, 1989 [JP] Japan .................................. 1-54976
Aug. 30, 1989 [JP] Japan .................................. 1-221719

[51] Int. Cl.[5] .................. G11B 23/03; G11B 5/016
[52] U.S. Cl. ................................. 360/133; 360/99.05
[58] Field of Search ................... 360/133, 134, 99.05, 360/99.12, 97.01

[56] References Cited

U.S. PATENT DOCUMENTS

| | | | |
|---|---|---|---|
| 3,919,719 | 11/1975 | Wright et al. | 360/134 |
| 4,544,977 | 10/1985 | Ozawa et al. | 360/133 |
| 4,608,617 | 8/1986 | Oishi et al. | 360/133 |
| 4,637,959 | 1/1987 | Ninomiya et al. | 360/135 |
| 4,660,119 | 4/1987 | Kato et al. | 360/135 |
| 4,754,356 | 6/1988 | Cooper | 360/128 |
| 4,768,123 | 8/1988 | Iizuka et al. | 360/133 |
| 4,855,857 | 8/1989 | Ono et al. | 360/133 |
| 4,899,244 | 2/1990 | Morse | 360/133 |

FOREIGN PATENT DOCUMENTS 58-35181 8/1981 Japan .
62-69870 10/1985 Japan .

*Primary Examiner*—A. J. Heinz
*Assistant Examiner*—Jefferson Evans
*Attorney, Agent, or Firm*—Cushman, Darby & Cushman

[57] ABSTRACT

In a disk cartridge of the invention, a lubricating polymer film as a resin in which a solid lubricant or a reinforcing material is dispersed is arranged in a case near the center hole of a disk. Since this lubricating polymer film is hardly abraded even with a disk whose number of revolutions per unit time is high, almost no dust is generated. Therefore, a disk cartridge with higher reliability can be provided.

16 Claims, 8 Drawing Sheets

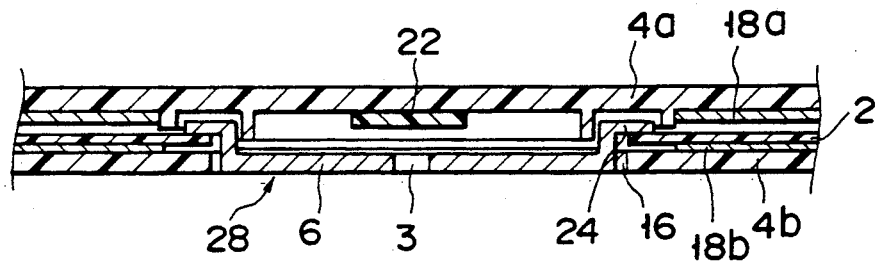
F I G. 3
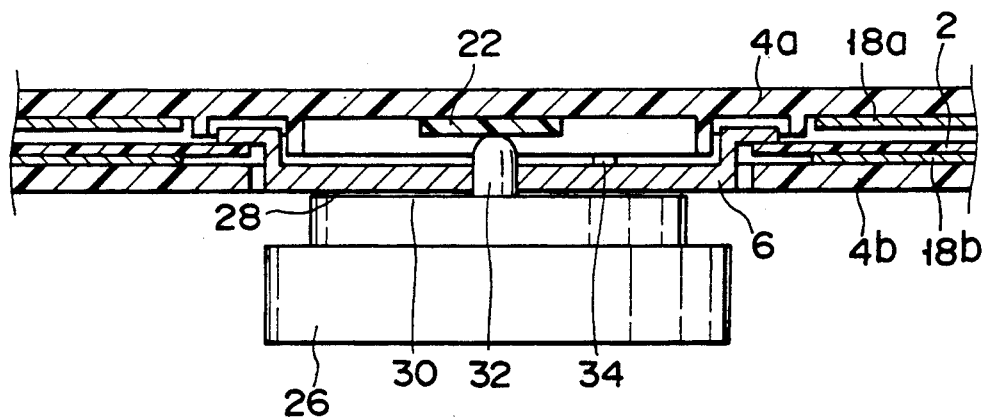
F I G. 4

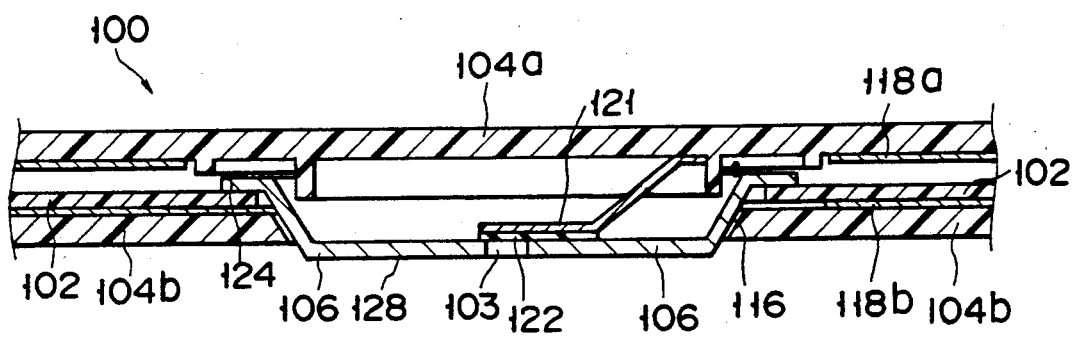
F I G. 11
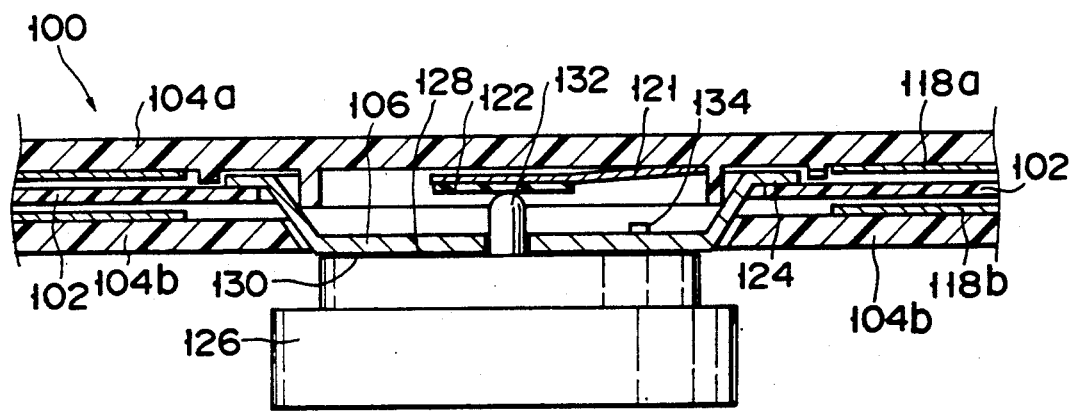
F I G. 12

DISK CARTRIDGE WITH LUBRICATING MEANS IN CONTACT WITH SPINDLE OF DRIVE MEANS

BACKGROUND OF THE INVENTION

1. Field of the Invention

The present invention relates to a disk cartridge in which a disk used as a recording means for recording data is rotatably housed and, more particularly, to an improvement in a portion of the disk cartridge which is brought into contact with the center spindle of a drive means which is externally inserted in the disk cartridge so as to rotate the disk.

2. Description of the Related Art

Recently, with the spread of personal computers, personal word processors, and the like, magnetic disk cartridges and the like have been increasingly used as and easy-to-use data recording means.

A 3.5-inch magnetic disk cartridge will be discussed as an example. The magnetic disk cartridge includes a disk coated with a magnetic material as a recording medium, and a pair of upper and lower cases for housing the disk. A hub is arranged at the center of the disk. The hub has holes formed both at its center and a position deviated from the center. Holes are also formed in the corner of the cases. A write protector for inhibiting data recording is positioned in these holes.

A pair of windows are formed in the cases so as to allow a magnetic head for reading from or writing data to, the magnetic disk to be inserted. A substantially U-shaped metal shutter is movably arranged to cover part of the cases. A circular hole is formed in one of the cases so as to expose the hub arranged at the center of the disk. Liners made of nonwoven fabrics are respectively formed surfaces of the upper and lower half cases against the disk so as to remove any foreign substance such as dust. A lifter is arranged between one case and the liner so as to press the liner toward the disk. The substantially U-shaped shutter is fitted on the assembled cases from a side. A spring is engaged with the shutter so as to bias the shutter in one direction.

In the disk cartridge having the above-described arrangement, in order to cause a disk drive means to rotate the disk, the center spindle is inserted into the center hole of the hub. In order to ensure a space in the cartridge, the center spindle is always brought into contact with the inner surface of the case which opposes the center spindle. For this reason, when the center spindle is rotated, the inner surface of the case is abraded by the spindle. As a result, dust is generated from the case upon abrasion, and a read error may be caused.

Published Unexamined Japanese Utility Model Application No. 62-69870 discloses a means for eliminating this drawback. According to the magnetic disk cartridge disclosed in this application, a lubricating polymer sheet is arranged, as a center sheet, on the inner surface of the case with which the center spindle is brought into contact. The center sheet consists of a resin such as ultra-high-molecular polyethylene. With this center sheet, scraping is not readily caused upon rotation of the center spindle, and hence dust is not easily generated, thus reducing the frequency of errors due to dust and the like.

Recently, higher recording capacities of such a recording apparatus and recording material have been achieved. This tendency is also recognized in the above-described type of magnetic disk cartridges. For this purpose, the recording tracks of the magnetic disk are narrowed, and the intervals of the tracks are reduced, and linear recording density is increased. Along with this tendency, in order to shorten the access time, the read speed of the recording tracks must be increased. For this purpose, the magnetic disk must be rotated at an even higher speed.

If the magnetic disk is rotated at a higher speed, substantially abrasion occurs even with a center sheet consisting of a generally used material. It was discovered through experimentation that hard materials, such as a lubricant-infiltrated sintered metal and surface is fluorinated metals, as the hard materials don't have a resilience, abrasion becomes more conspicuous than with center sheets consisting of the conventional materials. In addition, since the magnetic disk which is rotated at high speed inevitably has narrowed recording tracks and reduced track intervals, the adverse influences of dust are greatly increased. That is, even dust of a size which does not cause an error in normal tracks may cause an error in high-density narrow tracks. Therefore, reduction in foreign substance such as dust generated in a disk cartridge becomes indispensable for a magnetic disk with an increased data recording capacity.

SUMMARY OF THE INVENTION

It is an object of the present invention to provide a disk cartridge in which almost no foreign substance, such as dust, is generated even if it is a disk cartridge in which a large-capacity disk is rotated at high speed.

A disk cartridge of the present invention comprises recording means for recording, and reproducing data, a pair of housing means for rotatably housing the recording means therein, and center spindle sheet, consisting of a lubricating polymer film as a resin in which solid lubricant is dispersed. Or alternatively consisting of a lubricating polymer sheet as a lubricant resin in which reinforcement materials are dispersed. The center sheet is arranged on a portion of the housing means with which a tip of a spindle of a drive member is brought into contact.

According to the present invention, in the disk cartridge, as the center sheet is hardly abraded, generation of a foreign substance such as dust is greatly reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a partial sectional view of the magnetic disk cartridge taken along a line A—A in FIG. 1;

FIG. 4 is a partial sectional view showing a state in which a disk drive means is arranged on the magnetic disk cartridge in FIG. 3;

FIG. 11 is a partial sectional view of a magnetic disk cartridge according to the third embodiment of the present invention; and FIG. 12 is a partial sectional view showing a state in which a disk drive means is arranged on the magnetic disk cartridge in FIG. 11.

DETAILED DESCRIPTION OF THE PREFERRED EMBODIMENTS

Embodiments of the present invention will be described below with reference to the accompanying drawings.

Figure 1:
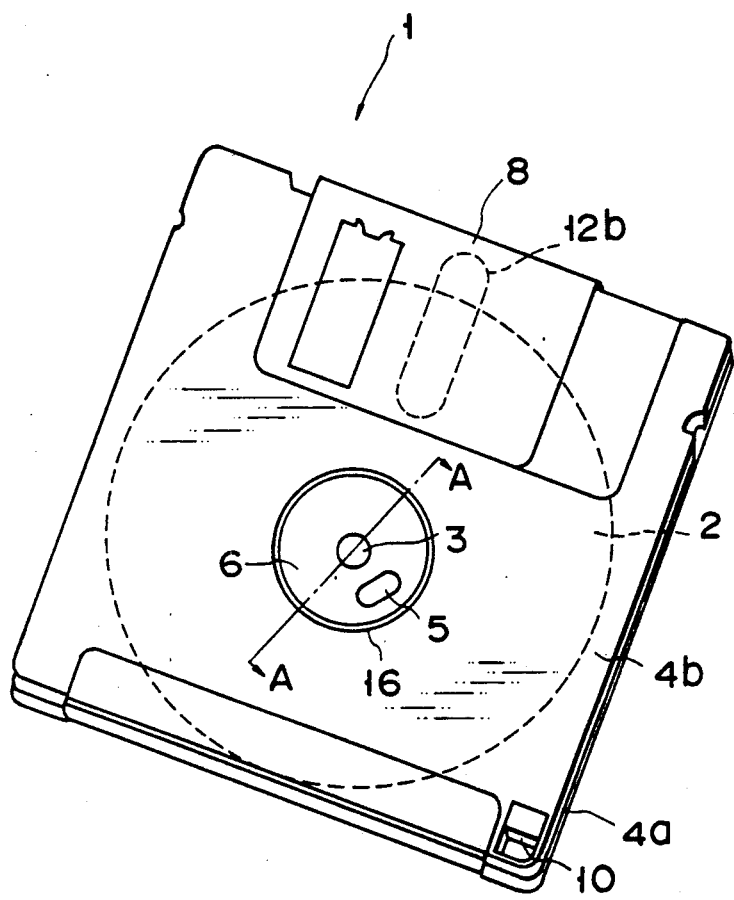
FIG. 1 is a perspective view showing a schematic arrangement of a magnetic disk cartridge according to the first embodiment of the present invention.

FIG. 1 shows a 3.5-inch magnetic disk cartridge 1 according to the first embodiment of the present invention. The cartridge 1 includes a disk 2 coated with a magnetic material as a recording medium, and a pair of upper and lower cases 4a and 4b, in which the disk 2 is rotatably housed. A hub 6 is arranged at the central portion of the disk 2. The hub 6 has holes 3 and 5 formed in its center and a position deviated from the center, respectively. A hole 16 is formed in the case 4b so as to expose the hub 6. Windows 12a and 12b are respectively formed in the cases 4a and 4b so as to allow a magnetic head (not shown) for reading data from, or writing data to, the magnetic disk 2 to be inserted. A substantially U-shaped metal shutter 8 is movably arranged on the cases 4a and 4b so as to cover the windows 12a and 12b. A write protector 10 for inhibiting data write is arranged at one corner of the cases 4a and 4b.

Figure 2:
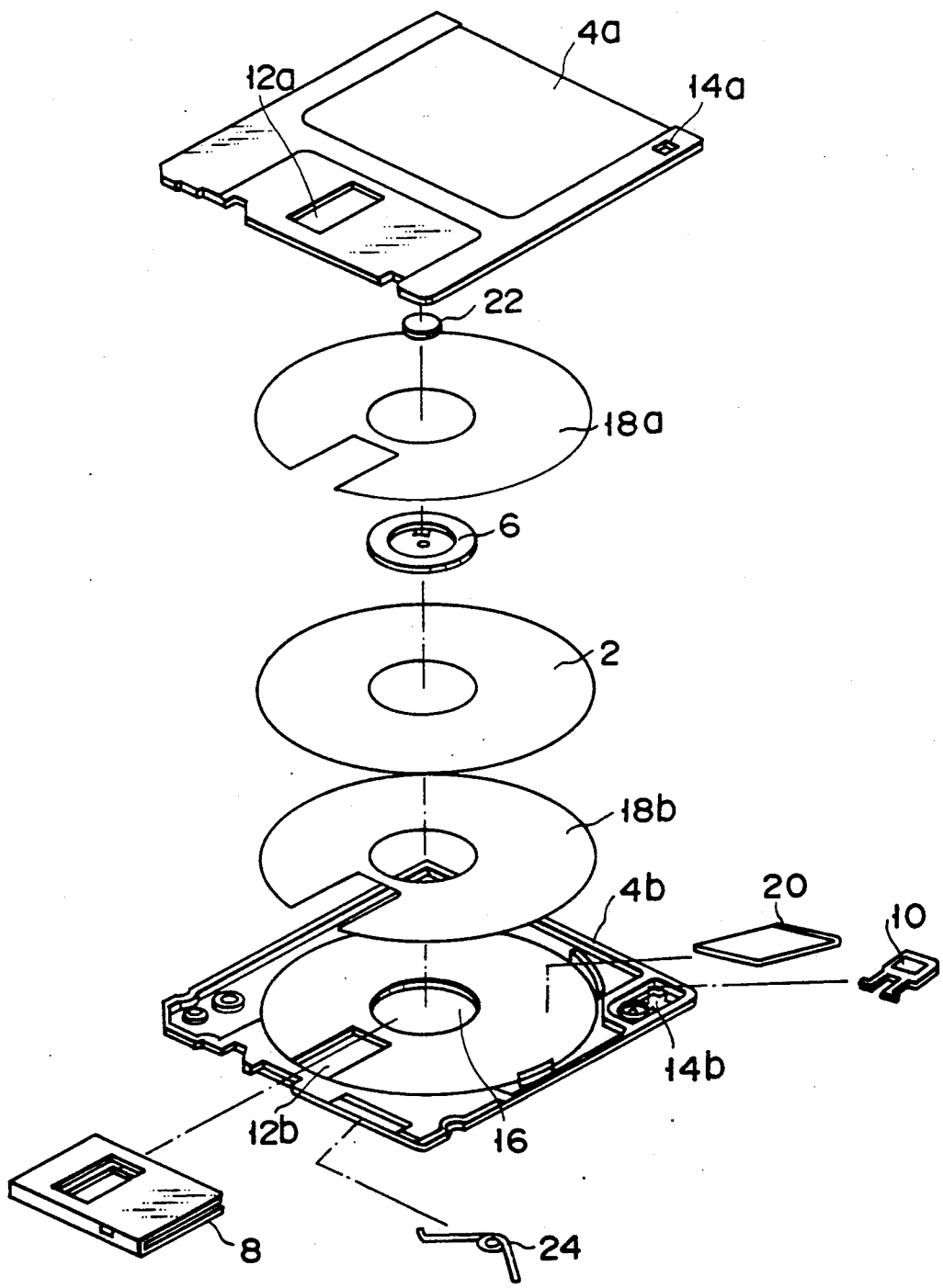
FIG. 2 is an exploded view of the magnetic disk cartridge in FIG. 1.

FIG. 2 is an exploded view of the magnetic disk cartridge 1. In addition, holes 14a and 14b for the write protector 10 are respectively formed in the cases 4a and 4b. Liners 18a and 18b made of unwoven fabrics are respectively arranged on the upper and lower surfaces of the cases 4a and 4b so as to help remove any foreign substance such as dust from the disk surface. A lifter 20 is arranged between the case 4b and the liner 18b so as to press the liner 18b toward the disk 2. The shutter 8 is fitted on the assembled cases 4a and 4b from a side. The shutter 8 closes the windows 12a and 12b except during operation periods. A spring 24 is engaged with the shutter 8 so as to bias the shutter 8 in a direction in which the shutter 8 closes the windows 12a and 12b. A lubricating polymer film is arranged, as a center sheet 22, on the inner surface of the case 4a (opposite the disk 2) near the hole 3 of the hub 6. The center sheet 22 is formed by coating a lubricating polymer film on a PET (polyethylene terephthalate) film. A vinyl resin in which $MoS_2$, as a solid lubricant, is dispersed is used as the lubricating polymer film. For example, MOLYDRY 1160 (available from Sumiko Junkatsuzai K.K.) may be used as this lubricating polymer film. In this embodiment, the center sheet 22 is formed to have a thickness of 5 $\mu$m.

FIG. 3 shows the magnetic disk cartridge 1 in an assembled state. FIG. 4 shows the magnetic disk cartridge 1 placed on a magnetic disk drive means 26. The hub 6 includes a flange portion 24 to be connected to the magnetic disk 2. In addition, the hub 6 includes a chucking surface 28 to be brought into contact with the magnetic disk drive means 26 for driving the disk. A surface 30 of the magnetic disk drive means 26 is chucked to the chucking surface 28 of the hub 6. A center spindle 32 of the magnetic disk drive means 26 is inserted in the center hole 3 of the hub 6. A drive pin 34 of the drive means 26 is inserted in the hole 5 of the hub 6. The pin 34 is inserted in the hole 5 so as to reliably transmit the rotational force of the magnetic disk drive means 26.

In consideration of durability and elasticity, the film need only have a thickness of about 1 to 10 $\mu$m. The lower limit of this range is determined because the abrasion of the center sheet is abruptly increased, as the center sheet does not have adequate resilience. The upper limit of this range is determined for the following reason. If the thickness of the center sheet exceeds 10 $\mu$m, the center sheet receives a large pressure from the spindle and is abraded.

According to the first embodiment of the present invention, even if the number of revolutions per predetermined period of time is increased with an increase in recording capacity, abrasion of the center sheet is not significantly increased.

Figure 5:
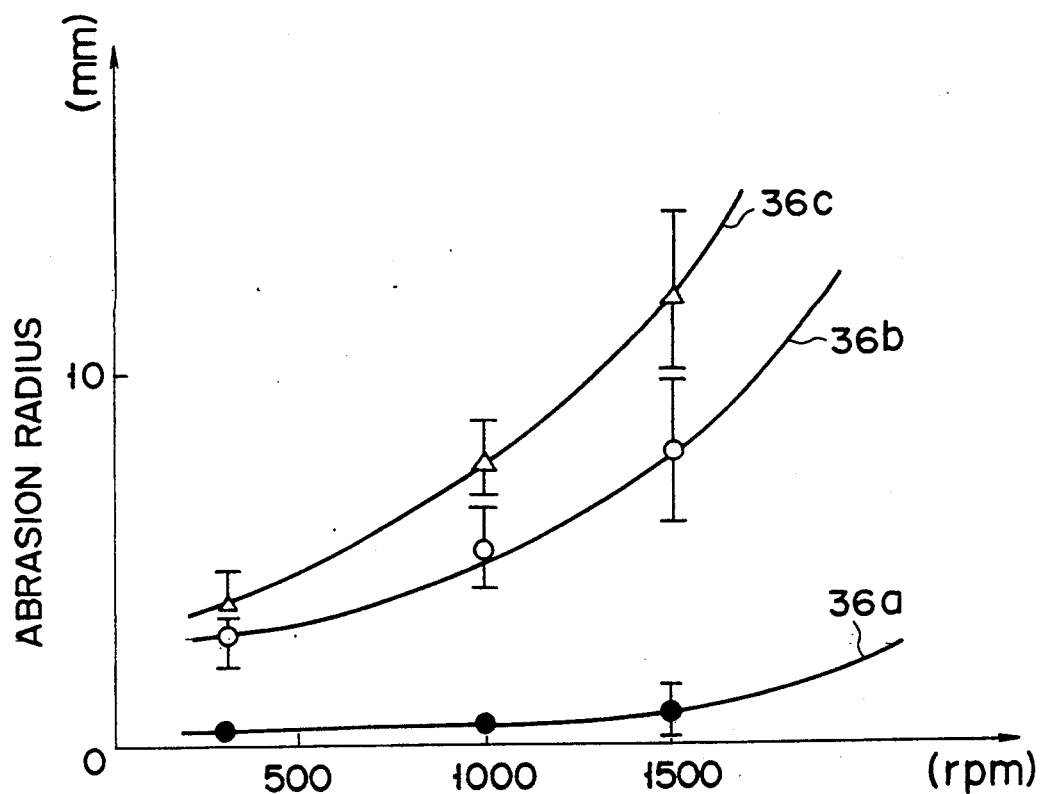
FIG. 5 is a graph showing a relationship between the number of revolutions and abrasion amounts of center sheets upon rotation of the magnetic disk cartridges of the first embodiment of the present invention and upon rotation of a conventional magnetic disk cartridge.

In this embodiment, $MoS_2$ is dispersed in the center sheet. However, other materials such as PTFE (Poly-Tetra-Fluoro-Ethylene) as a solid lubricant may be dispersed in the center sheet. FIG. 5 shows the result obtained when the disk cartridge 1, having a center sheet in which PTFE is dispersed, is driven by a magnetic disk drive means 26 with 20,000,000 passes at a temperature of 5° C. The ordinate axis represents the abrasion radius of the center sheet and the abscissa axis represents, the number of revolutions per minute (rpm) of the disk cartridge. A solid curve 36a represents a result based on an experiment on the center sheet constituted by a vinyl resin in which PTFE is dispersed; a solid curve 36b, a result based on an experiment on a conventional center sheet constituted by ultra-high-molecular polyethylene; and a solid curve 36c, a result based on an experiment on a center sheet constituted by a metal whose surface is fluorinated. As indicated by the solid curve in FIG. 5, abrasion radii which are recorded when the disk of the disk cartridge has a center sheet according to the present invention is rotated at 1,000 rpm and 1,500 rpm are about 1 mm. These abrasion radii are only slightly changed from an abrasion radius recorded when the same disk cartridge is rotated at 300 rpm. In contrast to this, the abrasion radii of the center sheet and the metal type center sheet are abruptly increased when the number of revolutions is increased to 1,000 rpm and 1,500 rpm, as indicated by the solid curves 36b and 36c.

Similar to the center sheet having $MoS_2$, the abrasion amount of the center sheet having PTFE is not increased. The present invention is not limited to the use of these materials. For Example, $WS_2$, or the like, may be used. Note that it is found from experiments that carbon which is often used as a solid lubricant for the conventional center sheets is not suitable for a center sheet of a high speed disk cartridge.

According to the first embodiment of the present invention, even if the number of revolutions per predetermined period of time is increased with an increase in recording capacity, the abrasion amount of the center sheet is not increased due to the use of a center sheet composed of the proper materials. In addition, since the number of steps in the manufacturing method of such a center sheet is not greatly increased, as compared with that of the conventional sheets, the center sheet can be easily manufactured.

A vinyl resin is used as a resin for the lubricating polymer film. However, the present invention is not limited to the use of vinyl resins. For example, an acrylic resin or a resin having high heat resistance such as an epoxy resin or polyester resin, or the like, may be used.

Figure 6:
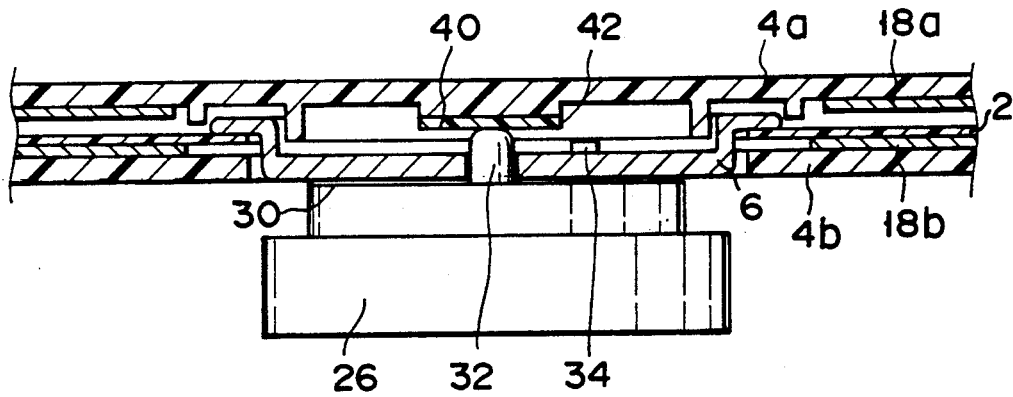
FIG. 6 is a partial sectional view showing a modification of the magnetic disk cartridge of the first embodiment.

FIG. 6 shows a modification of the first embodiment. The same reference numerals in FIG. 6 denote the same parts as in the first embodiment, and a description thereof will be omitted.

This modification is different from the first embodiment in that a rib 40 protruding from a case 4a is arranged at the position where the center sheet is arranged in the first embodiment. A center sheet 42 is formed on the rib 40. MOLYDRY 1160 as a vinyl resin, in which $MoS_2$ as a solid lubricant is dispersed, is directly coated, as the center sheet 42, on the rib 40. Since the center sheet 42 is directly coated on the rib 40, small recesses may be formed in the surface of the rib 40 so as to improve the adhesion strength. Also, the thickness of the center sheet is preferably set to be about 20 $\mu$m, which is larger than that of the center sheet in the first embodiment In consideration of resilience, the center sheet need only have a thickness of about 10 to 50 $\mu$m.

Similar to the first embodiment, in this modification, abrasion radii at 1,000 rpm and 1,500 rpm are not more than 1 mm. The lubricating polymer film of the above-described center sheet has a thickness of 5 $\mu$m. However, the present invention is not limited to this dimension. In consideration of durability and elasticity, the film need only have a thickness of about 1 to 10 $\mu$m.

In this modification, since the rib protrudes from the case, the center sheet can be directly coated on the rib. For this reason, the number of steps in the manufacturing process can be decreased as compared with the first embodiment. Therefore, productivity is further increased.

The second embodiment of the present invention will be described below.

Figure 7:
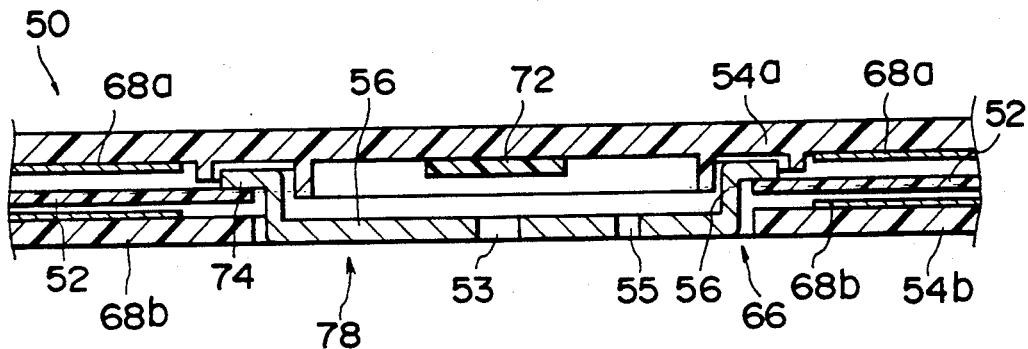
FIG. 7 is a partial sectional view of a magnetic disk cartridge according to the second embodiment of the present invention.

FIG. 7 shows a 3.5-inch magnetic disk cartridge 50 according to the second embodiment of the present invention. This cartridge 50 has substantially the same structure as that of the cartridge of the first embodiment. The cartridge 50 includes a disk 52 coated with a magnetic material as a recording medium, and a pair of upper and lower half cases 54a and 54b in which the disk 52 is housed. A hub 56 is arranged at the center of the disk 52. The hub 56 has holes 53 and 55 respectively formed at its center and a position deviated from the center. Windows (not shown) are respectively formed in the cases 54a and 54b so as to allow a magnetic head for reading or writing data from or in the magnetic disk 52 to be inserted. A substantially U-shaped metal shutter (not shown) is movably arranged on the half cases 54a and 54b so as to cover the windows. A spring (not shown) is engaged with the shutter so as to bias the shutter in one direction. A write protector (not shown) for inhibiting data write is arranged at one end of the cases 54a and 54b.

In addition, holes (not shown) for the write protector are formed. A circular hole 66 is formed in the case 54b so as to expose the hub 56 arranged at the center of the disk 52. Liners 68a and 68b made of nonwoven fabrics for aiding in removing any foreign substance, such as dust, are respectively arranged on the upper and lower surfaces of the cases 54a and 54b. A lifter (not shown) is arranged between the case 54b and the liner 68b so as to urge the liner 68b toward the disk 52. A rib (not shown) for pressing the liner 68a toward the disk 52 is integrally formed with the case 54a between the case 54a and the liner 68a. A lubricating polymer sheet is arranged, as a center sheet 72, on a surface of the case 54a which opposes the disk 52. A fluoroplastic in which polychlorotrifluoroethylene particles as a reinforcing material are dispersed is used as the lubricating polymer sheet for the center sheet 72. In this embodiment, the center sheet 72 is formed to have a thickness of 0.2 mm.

Figure 8:
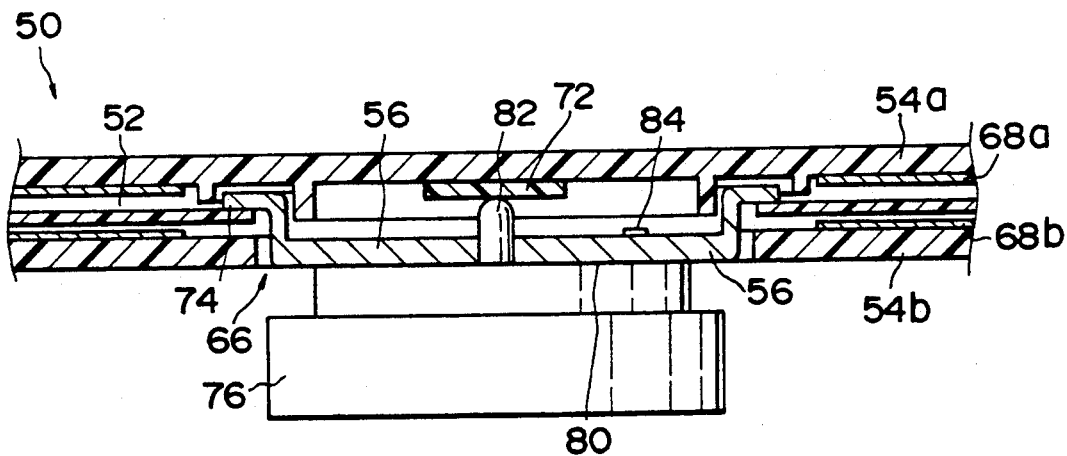
FIG. 8 is a partial sectional view showing a state in which a disk drive means is arranged on the magnetic disk cartridge in FIG. 7.

FIG. 7 shows the magnetic disk cartridge 50 in an assembled state. FIG. 8 shows the magnetic disk cartridge 50 placed on a magnetic disk drive means 76. The hub 56 has a flange 74 to be connected to the magnetic disk 52. In addition, the hub 56 has a chucking surface 78 to be brought into contact with the magnetic disk drive means 76. The magnetic disk drive means 76 has a surface 80 to be chucked to the chucking surface 78 of the hub 56. A center spindle 82 of the magnetic disk drive means 76 is inserted in the center hole 53 of the hub 56. A drive pin 84 of the drive means 76 is inserted in the hole 55 of the hub 56.

Figure 9:
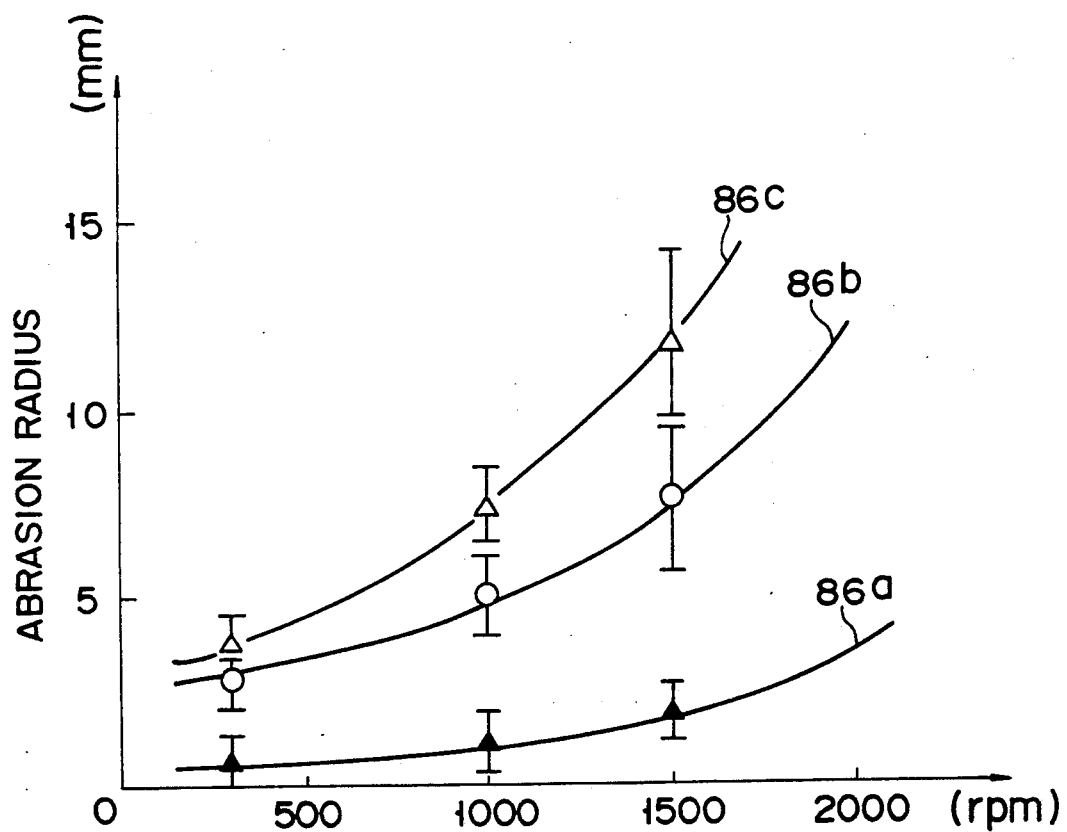
FIG. 9 is a graph showing a relationship between the number of revolutions and abrasion amounts of center sheets upon rotation of the magnetic disk cartridge according to the second embodiment of the present invention and upon rotation of a conventional magnetic disk cartridge.

In the above-described disk cartridge 50, polychlorotrifluoroethylene particles are dispersed as a reinforcing material of the lubricating polymer sheet of the center sheet. However, $MoS_2$ and a Cu-Zn alloy, or the like, may be used as a reinforcing material. FIG. 9 shows the result which is obtained when the disk cartridge, having the center sheet in which $MoS_2$ and the Cu-Zn alloy is dispersed, is driven by the magnetic disk drive means with 20,000,000 passes. The ordinate axis represents the abrasion radius of the center sheet; and the abscissa axis represents the number of revolutions per minute (rpm) of the disk cartridge. A solid curve 86a represents a result based on an experiment on the center sheet constituted by a fluoro plastic in which a Cu-Zn alloy and $MoS_2$ dispersed; a solid curve 86b represents a result based on an experiment on a conventional center sheet constituted by ultra-high-molecular-weight polyethylene; and a solid curve 86c represents a result based on an experiment on a conventional center sheet constituted by a metal having a Teflon-coated surface. As shown in FIG. 9, abrasion radii which are recorded when the disk cartridge is rotated at 1,000 rpm and 1,500 rpm are about 1 mm. These abrasion radii are only slightly changed from an abrasion radius which is recorded when the disk cartridge is rotated at 300 rpm. That is, the abrasion radius of the center sheet is hardly changed with an increase in the number of revolutions.

Figure 10:
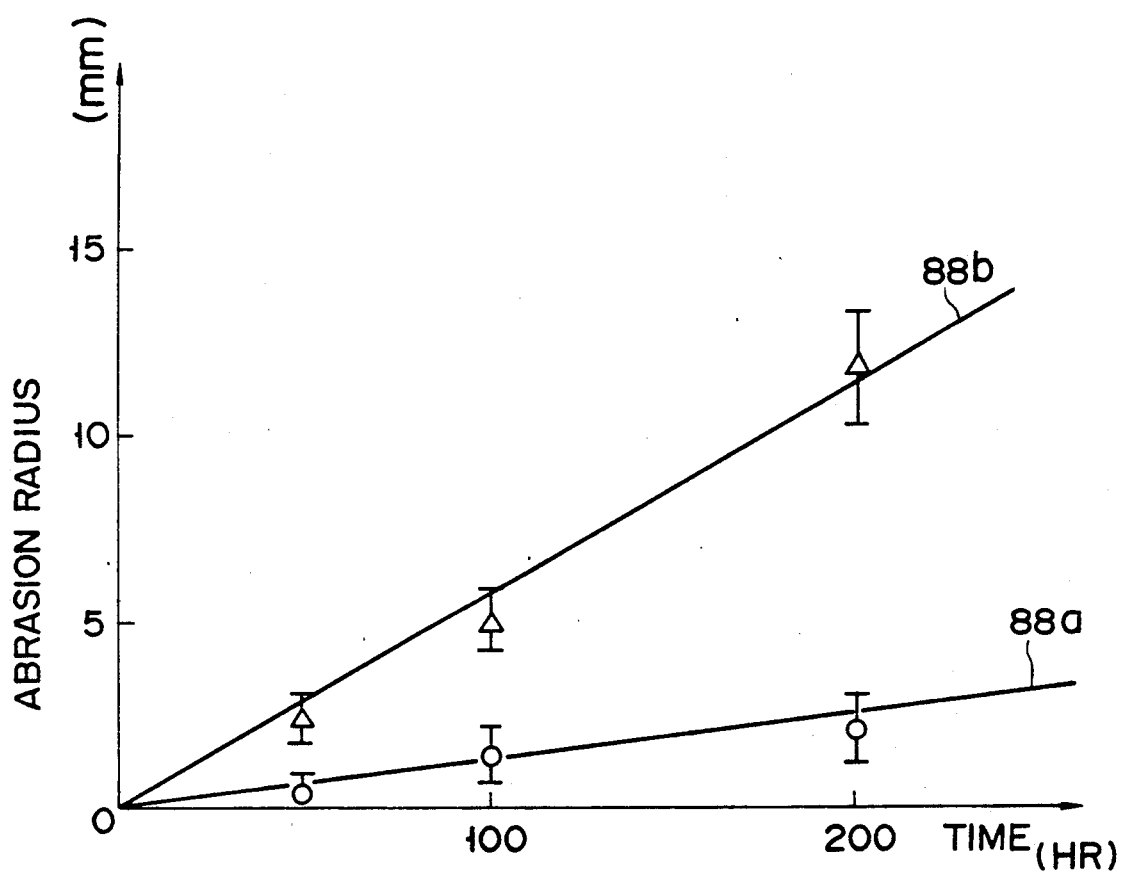
FIG. 10 is a graph showing abrasion amounts of center sheets, as a function of time, upon rotation of the magnetic disk cartridge according to the second embodiment of the present invention and upon rotation of a conventional magnetic cartridge.

FIG. 10 shows a result based on an experiment in which the disk is rotated at 1,500 rpm by the magnetic disk drive means at a temperature of 5° C. The ordinate axis of represents the abrasion radius of the center sheet; and the abscissa axis represents the time during which the disk is rotated. A solid curve 88a represents a result based on an experiment on the center sheet, in which $MoS_2$ and a Cu-Zn alloy in dispersed, according to the present invention; and a solid curve 88b represents a result based on a conventional center sheet constituted by ultra-high-molecular polyethylene. As is apparent from FIG. 10, the abrasion amount of the center sheet of the present invention is reduced to about 1/5 that of the conventional center sheet.

As described above, even if the number of revolutions per unit time is increased with an increase in recording capacity, an increase in abrasion amount of the center sheet can be suppressed. In addition, in the disk cartridge of this embodiment, the abrasion amount of the center sheet does not show an upward tendency, as represented by the shape of line 88a, even upon a long continuous operation. Therefore, drop-out and read errors due to abrasion of a center sheet can be essentially eliminated, and a large-capacity disk cartridge can be manufactured.

In the above-described embodiment, the thickness of the center sheet is 0.2 mm. However, the center sheet need only have a thickness of 0.05 to 0.3 mm. The upper limit of this range is determined because the thickness of a 3.5-inch disk cartridge is standardized. Therefore, if the thickness of a center sheet exceeds 0.3 mm, no margin in the cartridge will be left. If the center spindle is engaged with the hub in this state, the spindle receives a large pressure from the center sheet and cannot be properly rotated. The lower limit of this range is determined because the abrasion of the center sheet is abruptly increased, as the center sheet does not have adequate resilience.

In the above-described embodiment, polychlorotrifluoroethylene, or $MoS_2$ and the Cu-Zn alloy are used as a reinforcing material to be added in a fluoroplastic. However, the present invention is not limited to these materials. For example, $MoS_2$, Zn, Cu, or polychlorotrifluoroethylene, polyvinylidene fluoride, imide resin, amide resin, amide-imide resin, or their compound may be used. For example DAIFORCE-A (available from Daido Metal Co. Ltd.) may be sued as this lubricating polymer sheet.

The third embodiment of the present invention will be described below.

FIG. 11 shows a 3.5-inch magnetic disk cartridge 100 according to the third embodiment of the present invention. The cartridge 100 has substantially the same structure as that of the cartridge in the first embodiment. The cartridge 100 includes a disk 102 coated with a magnetic member as a recording medium, and a pair of upper and lower half 104a and 104b in which the disk 102 is housed. A hub 106 is arranged at the center of the disk 102. The hub 106 has holes 103 and 105 respectively formed at its center and a position deviated from the center. Windows (not shown) are formed in the cases 104a and 104b so as to allow a magnetic head for reading data from, or writing data to, the magnetic disk 102 to be inserted. A substantially U-shaped metal shutter (not shown) is movably arranged on the cases 104a and 104b so as to cover the windows. A spring (not shown) is engaged with the shutter so as to bias the shutter in one direction. A write protector (not shown) for inhibiting data write is arranged at one end of the cases 104a and 104b.

In addition, holes (not shown) for the write protector are formed. A circular hole 116 is formed in the case 104b so as to expose the hub 106 arranged at the center of the disk 102. Liners 118a and 118b made of nonwoven fabrics for aid in removal of foreign substance such as dust are respectively arranged on the upper and lower surfaces of the cases 104a and 104b. A lifter (not shown) is arranged between the case 104b and the liner 118b so as to press the liner 118b toward the disk 102. A rib (not shown) for urging the liner 118a toward the disk 102 is integrally formed with the case 104a between the case 104a and the liner 118a. A plate-like press member 121 consisting of stainless steel is arranged on the surface of the case 104a, which opposes the disk 102, around the center hole 103 of the case 104b. The press member 121 is located to normally seal the center hole 103 and presses the hub 106 toward the case 104b. In this state, the circular hole 116 is closed by the hub 106. Therefore, no foreign substance such as dust penetrates into the cartridge. A lubricating polymer sheet as a center sheet 122 is arranged on the surface of the press member 121 on the side of the case 104b. A fluoro-plastic in which $MoS_2$ and a Cu-Zn alloy particles as a reinforcing material are dispersed, is used as the lubricating polymer sheet for the center sheet 122. The center sheet 122 is formed to have a thickness of 0.2 mm.

FIG. 11 shows the magnetic disk cartridge 100 in an assembled state. FIG. 12 shows the magnetic disk cartridge 100 placed on a magnetic disk drive means 126. The hub 106 has a flange 124 to be connected to the magnetic disk 102. In addition, the hub 106 has a chucking surface 128 to be brought into contact with the magnetic disk drive means 126. The drive means 126 has a surface 130 to be chucked to the chucking surface 128 of the hub 106. As shown in FIG. 12, when the magnetic disk is to be driven by the magnetic disk drive means 126, a center spindle 132 of the drive means 126 is inserted in the center hole 103 of the hub 106. A drive pin 134 of the magnetic disk drive means 126 is inserted in the hole 105 of the hub 106. In this case, since the center spindle 132 is inserted in the center hole 103, the press member 121 is urged against the case 104a side by the center spindle 132. When the magnetic disk 102 is rotated by the center spindle 132, the center sheet 122 of the press member 121 is in contact with the center spindle 132.

The following is the result obtained when the above-described disk cartridge 100 is rotated by the magnetic disk drive means 126 with 20,000,000 passes at a temperature of 5° C. When the magnetic disk drive means 126 is set at 1,000 rpm and 1,500 rpm, the abrasion radii are not more than 1 mm. These abrasion radii are only slightly changed from an abrasion radius at 300 rpm. Therefore, in the third embodiment, the same experimental result is obtained as in the second embodiment.

In the third embodiment, since the press member 121 is utilized, the elasticity of the member to be brought into contact with the center spindle is further increased. Therefore, even if the center spindle is brought into contact with the center sheet, the abrasion amount can be greatly reduced. In addition, since the press member 121 seals the hole 103 while the cartridge is not used, no dust can enter.

With the above-described disk cartridge, even if the number of revolutions per unit time is increased with an increase in recording capacity, an increase in abrasion amount of the center sheet can be suppressed. In addition, in the disk cartridge of the this embodiment, the abrasion amount of the center sheet does not show an upward tendency even upon a long continuous operation. Therefore, drop-out and read errors due to abrasion of a center sheet can be minimized, and a reliable large-capacity disk cartridge can be manufactured.

In the above-described embodiment, the thickness of the center sheet is 0.2 mm. However, the center sheet need only have a thickness of 0.05 to 0.3 mm. The lower limit of this range is determined because the durability of the center sheet decreases as thickness decreases. The upper limit of this range is determined because the center spindle receives a large pressure from the center sheet and cannot rotate adequately if the center sheet is too thick.

In the third embodiment, the press member has a plate-like shape. However, the present invention is not limited to this design. For example, it may have a coil-like, or the like shape. In addition, $MoS_2$ and Cu-Zn alloy are used as a reinforcing material to be added in a fluoroplastic. However, the present invention is not limited to these materials. For example, a metallic material such as $MoS_2$, Zn, Cu, or a Cu-Zn alloy, polychlorotrifluoroethylene, or polyvinylidene fluoride, an imide resin an amide resin, an amide-imide resin, or their compounds may be used.

A center sheet in which a reinforcing material consisting of a metal is dispersed may be subjected to abrasion if the center spindle is rotated at high speed for a long period of time. If, however, the thickness of a center sheet is properly set or a center sheet is arranged on an elastic member as described above, abrasion of the center sheet can be prevented.

If dust and the like adhere to a magnetic disk cartridge, the disk may be damaged upon driving of a magnetic head. As a result, no data may not be read. Therefore, the present invention can be effectively applied to a magnetic disk cartridge.

In the disk cartridges to which the present invention is applied, almost no dust is generated from the center sheet even if the disk is rotated at high speed. Therefore, drop-out and read errors are not minimized.

In the three embodiments, the magnetic disk cartridge in/from which data is magnetically recorded/reproduced is exemplified. However, the present invention is not limited to this but may be applied to an optical disk or a magneto-optic disk.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A disk cartridge driven by a drive means, comprising:
    data storage means for storing data;
    a pair of housing means for rotatably housing said recording means therein; and
    a lubricating polymer film as a resin in which a solid lubricant is dispersed, said lubricating polymer film being arranged on a portion of said housing means which a tip of a spindle of the drive means is brought into contact with, said lubricating polymer film having a thickness of 1 to 10 $\mu$m.

2. A cartridge according to claim 1, wherein said lubricating polymer film has a thickness of 5 $\mu$m.

3. A disk cartridge driven by a drive means, comprising:
    data storage means for storing data;
    a pair of housing means for rotatably housing said recording means therein; and
    a lubricating polymer film as a resin in which a solid lubricant is dispersed, said lubricating polymer film being arranged on a portion of said housing means which a tip of a spindle of the drive means is brought into contact with, said resin and said solid lubricant of said lubricating polymer film respectively consisting of a vinyl resin and $MoS_2$.

4. A disk cartridge driven by a drive means, comprising:
    data storage means for storing data;
    a pair of housing means for rotatably housing said recording means therein; and
    a lubricating polymer film as a resin in which a solid lubricant is dispersed, said lubricating polymer film being arranged on a portion of said housing means which a tip of a spindle of the drive means is brought into contact with, the portion of said housing means on which said lubricating polymer film is arranged being protruded, said lubricating polymer film having a thickness of 10 to 50 $\mu$m.

5. A disk cartridge driven by a drive means, comprising:
    data storage means for storing data;
    a pair of housing means for rotatably housing said data storage means therein; and
    a lubricating polymer sheet as a resin in which a reinforcing material is dispersed, said lubricating polymer sheet being arranged on a portion of said housing means which a tip of a spindle of the drive means is brought into contact with, said resin of said lubricating polymer sheet consisting of a fluoroplastic.

6. A disk cartridge driven by a drive means, comprising:
    data storage means for storing data;
    a pair of housing means for rotatably housing said data storage therein; and
    a lubricating polymer sheet as a resin in which a reinforcing material is dispersed, said lubricating polymer sheet being arranged on a portion of said housing means which a tip of a spindle of the drive means is brought into contact with, said lubricating polymer sheet having a thickness of 0.05 to 0.3 mm.

7. A cartridge according to claim 6, wherein said lubricating polymer sheet has a thickness of 0.2 mm.

8. A disk cartridge driven by a drive means, comprising:
    data storage means for storing data;
    a pair of housing means for rotatably housing said data storage therein; and
    a lubricating polymer sheet as a resin in which a reinforcing material is dispersed, said lubricating polymer sheet being arranged on a portion of said housing means which a tip of a spindle of the drive means is brought into contact with, said resin and a solid lubricant of said lubricating polymer sheet respectively consisting of a fluoroplastic and polychlorotrifluoroethylene.

9. A disk cartridge driven by a drive means, comprising:
   data storage means for storing data;
   a pair of housing means for rotatably housing said data storage means therein; and
   a lubricating polymer sheet as a resin in which a reinforcing material is dispersed, said lubricating polymer sheet being arranged on a portion of said housing means which a tip of a spindle of the drive means is brought into contact with, said resin and a solid lubricant of said lubricating polymer sheet respectively consisting of a fluoroplastic and $MoS_2$, the Cu-Zn alloy.

10. A disk cartridge driven by a drive means, comprising:
   data storage means for storing data, said storing means including a hub having a hole which is formed at a central portion of said hub and into which the driving means is to be engaged;
   a pair of housing means for rotatably housing said data storage means therein, an opening being formed in a central portion of one of said housing means so as to expose said hub of said data storage means;
   press means for urging said hub against the opening of one of said housing means; and
   a lubricating polymer sheet as a resin in which a reinforcing material is dispersed, said lubricating polymer sheet being arranged on said press means and being brought into contact with a tip of a spindle of the drive means.

11. A cartridge according to claim 10, wherein said resin of said lubricating polymer sheet consists of a fluoroplastic.

12. A cartridge according to claim 10, wherein said reinforcing material of said lubricating polymer sheet consists of at least one member selected from the group consisting of $MoS_2$, Zn, Cu, a Cu-Zn alloy, polychlorotrifluoroethylene, and polyvinylidene fluoride, an amide resin, an imide resin, an amide-imide resin.

13. A cartridge according to claim 10, wherein said lubricating polymer sheet has a thickness of 0.05 to 0.3 mm.

14. A cartridge according to claim 13, wherein said lubricating polymer sheet has a thickness of 0.2 mm.

15. A cartridge according to claim 10, wherein said resin and a solid lubricant of said lubricating polymer sheet respectively consist of a fluoroplastic and $MoS_2$, the Cu-Zn alloy.

16. A cartridge according to claim 10, wherein said press means comprises a leaf spring made of stainless steel.

* * * * *